(12) United States Patent
Vrielink et al.

(10) Patent No.: US 8,881,304 B2
(45) Date of Patent: Nov. 4, 2014

(54) METHOD OF CONTROLLED ACCESS TO CONTENT

(75) Inventors: Koen Hendrik Johan Vrielink, Eindhoven (NL); Robert Paul Koster, Eindhoven (NL); Lukasz Szostek, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1474 days.

(21) Appl. No.: 11/996,590

(22) PCT Filed: Jul. 7, 2006

(86) PCT No.: PCT/IB2006/052303
§ 371 (c)(1),
(2), (4) Date: Jan. 24, 2008

(87) PCT Pub. No.: WO2007/012988
PCT Pub. Date: Feb. 1, 2007

(65) Prior Publication Data
US 2008/0209577 A1 Aug. 28, 2008

(30) Foreign Application Priority Data
Jul. 25, 2005 (EP) .................................... 05106793

(51) Int. Cl.
*G06F 7/04* (2006.01)
*G06F 21/10* (2013.01)

(52) U.S. Cl.
CPC .................................. *G06F 21/105* (2013.01)
USPC ................... 726/29; 726/26; 726/27; 726/28; 726/32; 726/33

(58) Field of Classification Search
None
See application file for complete search history.

(56) References Cited

U.S. PATENT DOCUMENTS

| 5,717,604 A | 2/1998 | Wiggins | |
|---|---|---|---|
| 7,565,322 B1 * | 7/2009 | Feldman et al. | 705/50 |
| 2004/0003398 A1 | 1/2004 | Donian et al. | |

(Continued)

FOREIGN PATENT DOCUMENTS

| WO | 02073378 A2 | 9/2002 |
|---|---|---|
| WO | 2004010353 A1 | 1/2004 |

(Continued)

OTHER PUBLICATIONS

Melissa Anderson, et al: "Technology Overview Report Instant Messaging", Univ. Wisconsin-Madison, Dec. 2002, Consortium for Global Electronic Commerce, pp. 1-3.

(Continued)

*Primary Examiner* — Alexander Lagor (57) ABSTRACT

A method of controlled access to content, comprising joining an access sharing network, obtaining a content item from the access sharing network which requires access control data to enable playback, obtaining the access control data, determining from the access control data that a particular other device is authorized to play back the content item, and enabling playback of the content item in accordance with the access control data upon a positive determination that said other device is a member of said access sharing network. Preferably the access control data is used also during a predetermined period of time after making a determination that said other device has ceased to be a member of the access sharing network. Also a device (101) configured to carry out the method.

8 Claims, 3 Drawing Sheets

(56) References Cited

U.S. PATENT DOCUMENTS

2005/0049973 A1     3/2005   Read et al.
2005/0071435 A1*   3/2005   Karstens .................. 709/207
2005/0080746 A1*   4/2005   Zhu et al. ................. 705/59

FOREIGN PATENT DOCUMENTS

WO    WO 2004038568 A2 *   5/2004
WO    WO 2005057846 A1 *   6/2005
WO    2005101226 A1    10/2005

OTHER PUBLICATIONS

BitTorrent—http://www.bittorrent.com.

* cited by examiner

METHOD OF CONTROLLED ACCESS TO CONTENT

The invention relates to the sharing of content items, for example peer-to-peer type sharing, and in particular to the regulation of such sharing.

File sharing services and technologies, such as BitTorrent, KaZaa, or Gnutella, are widely known on the Internet. They are used by millions of users to exchange content items such as music, typically in MP3 format. Each user can offer his own music collection to everyone else, which allows everyone to have a large selection of music available for downloading. Users have instant messaging ("chat") functionality available to communicate directly with other users, for example to make requests or to comment on exchanged content items.

In addition, instant messaging services such as MSN Messenger, AOL Instant Messenger, Yahoo! Messenger and others are quite popular today. In such services also file sharing facilities are available, although they usually are more limited in functionality. An overview of instant messaging technologies may be found in Melissa Anderson et al., Technology Overview Report Instant Messaging, University of Wisconsin-Madison, December 2002.

However, the content items offered on these file-sharing services is typically popular music and movies, which is offered without the permission of the copyright holders. To ensure the copyright holders get the royalties they are entitled to, some file sharing services have started to charge a subscription fee to its users. Part of the revenue from the subscription fees can then be used to pay the copyright holders.

Recently various so-called Digital Rights Management (DRM) systems have been developed. In their most basic form, the systems simply try to prevent copying of content. Such systems are sometimes also referred to as copy protection systems. More extensive DRM systems provide elaborate rights management to facilitate various different business models. For example, a user can purchase a right to play back a content item ten times, or a right to distribute a copy of the content item to another user.

Most users at present are accustomed to freely sharing the content items they purchase on compact discs or DVDs, or the objects they download from other users. This suggests that the new DRM-based business models might not be well received by these users. However, if unlimited copying and distribution in digital form is permitted without any form of copyright protection, the content industry will be seriously harmed. A fair balance between the interests of the rights holders and the desires of the users needs to be struck.

It is an object of the present invention to provide a method of controlled access to content, which can strike such a balance.

This object is achieved according to the invention as claimed in claim 1. Preferably the obtained access control data is only used for a limited period of time. By sharing access control data between nodes in a file sharing network, access to content is restricted to only those devices on said network.

One advantage of the invention is that now users are able to share a common experience associated with some piece of protected content. The intent is to do this in such a limited and restricted way that it does not intrinsically hurt the business models of the content owners, i.e. the content should be consumed in such circumstances that it would not discourage a potential buy by that user. An important restriction therefore is that users actively do something together, e.g. communicate, while they experience the content. In many cases this will concern activities in the family sphere, where many countries' copyright laws provide exemptions.

In an embodiment the method comprising determining whether said other node is still a member of the access sharing network. The access control data should now be used only during periods of time when this is the case. This enables sharing of content between nodes on the access sharing network. Once a client leaves the network, it can no longer play back the content. This establishes a community of people on the network who are all jointly watching the content.

In another embodiment the method comprises monitoring an activity level of the device and computing a validity period of the access control data from the data obtained by said monitoring. This enables sharing of content between "active" nodes on the access sharing network, which closely fits consumers' perception of acceptable sharing. Today two persons can share content by visiting each other and jointly watching e.g. a television program or a DVD. The invention enables a similar mechanism over access sharing networks. If the users actively communicate with each other, they may jointly watch the content item.

Advantageous embodiments are set out in the dependent claims.

The invention also provides a device configured to carry out the method, a computer program product and an access sharing network.

These and other aspects of the invention will be apparent from and elucidated with reference to the embodiments shown in the drawing, in which.

Throughout the figures, same reference numerals indicate similar or corresponding features. Some of the features indicated in the drawings are typically implemented in software, and as such represent software entities, such as software modules or objects.

Figure 1:
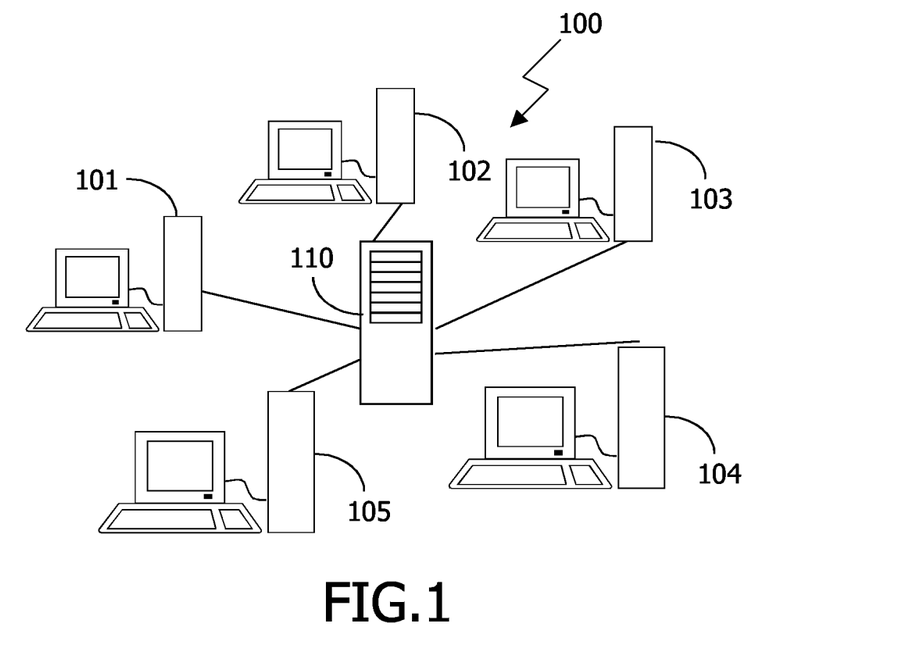
FIG. 1 schematically shows a file sharing network comprising plural clients.

FIG. 1 schematically shows an access sharing network 100 comprising plural access sharing clients 101, 102, 103, 104 and 105. Although shown here as a physical network, with direct connections between the clients 101-105, the network 100 is best regarded as a conceptual or virtual network. That is, it is not necessary that all clients 101-105 are physically or network-wise directly connected to each other all the time. All that is needed is that one client "on the network" can obtain files or objects from another client. Also, even when direct client-to-client connections are used, it is not necessary that all clients are connected to all other clients.

The network 100 comprises a server 110, which performs a directory service for the clients 101-105. To connect to the access sharing network 100, a client 101 submits a list of the files (or objects) it wants to share to the server 110. The server 110 combines the lists it receives from all the clients connected to the network 100. Other clients 102-105 can then connect to the server 110 and browse the combined list or search for specific objects on the list. They can subsequently contact the client that has the object they are looking for, and obtain (download) it from that client directly. This way, the server 110 does not directly participate in the sharing of files or objects between the clients 101-105. This approach is well known.

Figure 2:
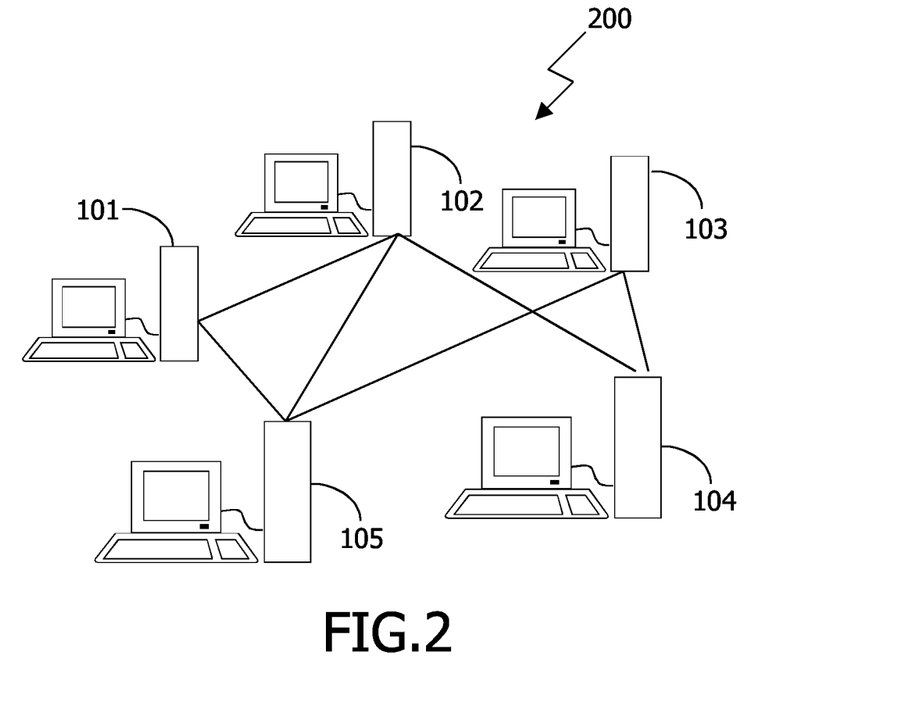
FIG. 2 shows a file sharing client in more detail.

It is also possible to realize the network without the server 110, as illustrated in FIG. 2. In that case, a client 101 connects to the network 200 by connecting to one or more other clients 102-105 that are already on the network 100. A client searches the network by sending a search request to the clients it is connected to. These clients examine their list of objects which they share, and return a result if the requested object is in that list. Furthermore, the request is forwarded to other clients connected to these clients. This way, the request is distributed throughout the entire network 100 until it is received by a client which can fulfill it, or until all clients have received it and none are able to fulfill it.

Such an embodiment is known from e.g. the Gnutella file sharing network. A disadvantage of this embodiment is that the network 100 is not scalable. Gnutella like networks currently for example cannot support 1 million clients. Furthermore the network becomes slow if there are a number of "slow" computers, i.e. computers with limited bandwidth to the network 100, processing power and/or memory.

Alternatively the client 101 can, after connecting to the one or more other clients 102-105, submit its list of files or objects it wants to share to those other clients 102-105. The list is then passed on to all the clients on the network 100. This way, all clients know which clients have which files or objects available, and can contact that client directly.

The known KaZaa file sharing network also operates without a server 110, but to overcome the above-mentioned problem uses two types of clients: a super node and a "normal" client. Super nodes are clients which have sufficient bandwidth, processing power and memory. A normal client connects to the network by connecting to a super node and sends the list of the files to be shared to the super node. A super node has connections to a number of clients and furthermore is also connected to a number of other super nodes.

A super node is at the same time also a normal client. That is, for the user the fact that his computer is a super node is transparent. When a user wants to search for a file, his client sends a request to the super node(s) to which his client is currently connected. The super nodes returns the matching files, that are in the lists send by its clients. Furthermore the super node forwards the request, if necessary, to all the super nodes to which it is connected in a fashion similar to the one described above in the Gnutella embodiment. However, since the connections between super nodes have a large bandwidth this approach is much faster than the Gnutella networks. Furthermore it can be scaled up to millions of clients.

Such sharing networks, typically referred to as peer-to-peer or P2P file sharing networks, have an enormous popularity. Well known examples of these networks are: Napster, Musiccity, Gnutella, Kazaa, Imesh and Bearshare. Once users have installed the appropriate client software on their personal computers, they can share their files and they are able to download files shared by other users. The clients 101-105 may be connected to a network such as the Internet, which facilitates the establishment of the access sharing network 100. A client could e.g. use a direct TCP/IP connection to another client to obtain a file or object.

On the most popular networks, usually over 500,000 people are connected simultaneously. At the time of writing, people are mostly sharing music files (often in the MP3 format), but the sharing of movies is gaining popularity. The term "content item" will be used to denote files containing music, songs, movies, TV programs, pictures and other types of binary data, but also textual data can be shared in this fashion. It is to be noted that a content item may be made up of several different files.

International patent application WO 2004/010353 discloses a system in which the clients 101-105 obtain identifiers for content items they share and register usage information for these content items. The usage information is then supplied to a third party. The third party subsequently bills the user of the client which shared the content in accordance with the registered usage information. The third party could for example be a copyright clearinghouse such as the RIAA or the Dutch BUMA/Stemra. The third party could be a party to the access sharing network 100, although this is not necessary. The access sharing clients 101-105 could simply employ a direct Internet connection, e.g. using the World-Wide Web, to the third party, e-mail the usage information to an e-mail address for the third party or use some other channel to transmit the usage information to the third party.

Figure 3:
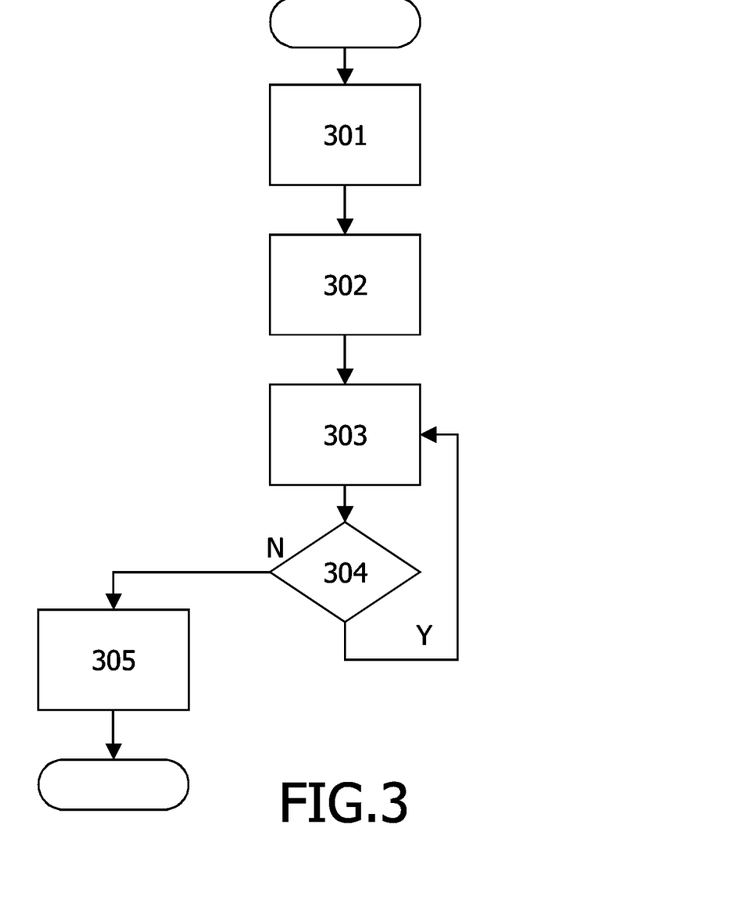
FIG. 3 schematically shows a server and a fingerprint database in more detail.

FIG. 3 illustrates a process of playback of a content item obtained from the access sharing network 100, 200 by a device. For the sake of explanation device 101 is chosen. In step 301, the device 301 obtains the content item from the access sharing network. As explained above, access to the content items can be restricted. This can be done in various ways. This means that access control data is required to enable playback, recording or other operations of the content item.

Such access control data typically comprises one ore more indications of the permissions that are granted. For instance the access control data may indicate the content item may be played back once. Or it could indicate the content may be played back as many times as desired, although it may not be recorded permanently on a storage medium such as a CD-ROM.

Preferably access to the content is restricted using a Digital Rights Management (DRM) system. With such a system, the content is encrypted and access to the content is only allowed if a so-called license is available and evaluated successfully. The license contains the access control data and typically also a decryption key that is necessary to decrypt the content. In some systems the decryption key is available from another source, or already available in the device 101. In such a case the device 101 then is configured to only use the decryption key if the license is available and contains the right permissions for the requested operation.

In accordance with the present invention, the device 101 now obtains in step 302 the access control data from one of the other nodes in the access sharing network 100, 200, say device 105. With this access control data the device 101 enables playback of the content item in accordance with the access control data in step 303. This way it is achieved that the content item is shared between devices 101 and 105, allowing them to initiate a "community session" in which the users of said devices can share the playing of the content item.

Note that the device from which the content item is obtained is not necessarily the same device as the device from which the access control data is obtained. Although this is likely, since a device sharing the content is likely to also have the necessary access control data, a device may also share content for which it has no access control data.

Preferably the obtained access control data is only used for a limited period of time. This ensures that the device 101 cannot use the obtained content item in an unlimited fashion.

In an embodiment the device 101 determines in step 304 whether the device 105 is still a member of the access sharing network 100, 200. The device 101 grants access to the content, e.g. by using the access control data only during periods of time when this is the case.

One way to determine whether the other node is still a member of the access sharing network 100, 200 is to detect how much data is being received from the device 105. If no data has been received from this device for a predetermined period of time, it can be concluded that the device 105 is no longer a member of the network. This data may be content that is shared by the device 105, but preferably it is data that indicates the user of the device 105 is actively participating in the network. For instance the data can be words or sentences typed on an instant messaging client.

In another embodiment the device 101 monitors an activity level of the device 105 or its user and computes a validity period of the access control data from the data obtained by said monitoring. This activity level may be activity such as talking in one or more instant messaging channels provided on the access sharing network 100, 200. If this activity level monitoring data matches a certain criterion, it can be concluded that the device 105 is still a member of the access sharing network 100, 200. For example if more than 50 words are received in a five-minute time window, the device 105 is still a member. A negative criterion is also possible. For example, if no messages are typed in a three-minute time window, it can be concluded that the device 105 is no longer a member of the access sharing network.

Once it has been determined that the device 105 has ceased to be a member of the access sharing network 100, 200, the method ends.

In an alternative embodiment the method proceeds to step 305 in which the device 101 still uses the access control data but only for a predetermined period of time after making the negative determination in step 304. This provides some additional flexibility and increases user-friendliness, because now the user of device 101 can continue watching the content item even when the device 105 has been disconnected.

In addition, this embodiment provides the advantage that a temporary network outage does not interrupt the playback of the content item on device 101. Such a temporary outage will result in a negative determination of step 304. By choosing the predetermined period of time larger than an average outage, it is achieved that the negative determination will not affect the playback. Once the outage is over, the device 105 will rejoin the network 100, 200 and the access control data may be used once more as per step 303.

Optionally the device 101 may provide to other nodes in the access sharing network certified information regarding content usage on the device 101.

Figure 4:
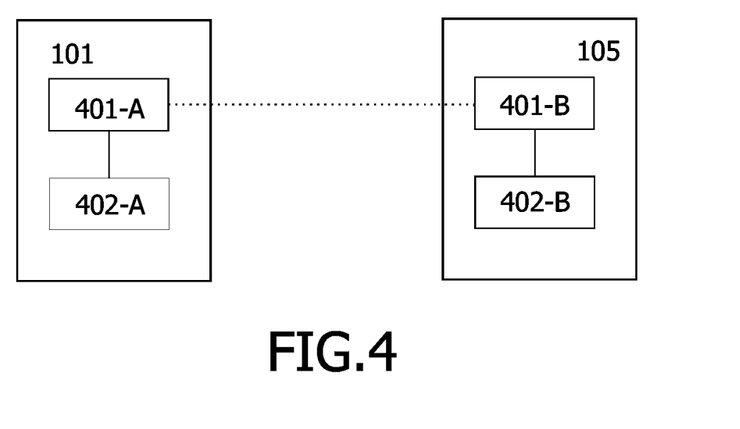
FIG. 4 schematically illustrates a communication session between devices 101 and 105.

FIG. 4 schematically illustrates a communication session between devices 101 and 105. Only those elements that are relevant to the present invention are illustrated for the sake of clarity. It will be readily apparent to the skilled person that components like communication hardware and/or software, an operating system and so on may be needed.

Both devices 101, 105 are equipped with a sharing application 401. The applications 401-A and 401-B have established a connection between the devices 101, 105 to allow exchange of content items. To control access to content, both devices 101, 105 are also equipped with a DRM agent 402. The device 101 can only play a protected content item if the DRM agent 402-A can obtain valid access control data and preferably is also able to successfully evaluate the access request given the requested operation, the access control data and context.

First, the device 101 obtains a content item from the access sharing network as usual. When it is found that the content item is protected, the device 101 needs to determine if it has valid access control data. If not, the device 101 then requests this data from the access sharing network. As explained above with reference to FIGS. 1 and 2, the request can be made to the central server 110 or directly to one or more other nodes 102-105.

Assume that device 105 has the necessary access control data. The devices 101, 105 now set up a connection to transfer this data from the device 105 to the device 101. Preferably this connection is secured and/or authenticated. This ensures that the access control data cannot be intercepted or copied by an attacker.

The access control data may comprise a license and cryptographic data that will enable DRMAgent 402-A to render the content item on device 101. The DRM agent 402-A evaluates the license, and if everything checks out, the agent 402-A decrypts the content item using the cryptographic data, so that the content can be rendered.

Before transferring the access control data to the device 101, the DRM agent 402-B preferably first checks if the request from device 101 to transfer the access control data is permitted. The access control data may have an indication that informs whether the access control data may be shared with other nodes in a sharing network, or under which conditions.

Preferably the access control data specifies one ore more of the following options. Note that not all the options below are mandatory and more then one can be specified simultaneously:

Whether the content item may be made available to other nodes in the access sharing network in accordance with the present invention.

The maximum number of possible participants that are members of the network.

The maximum number of actual participants in a session.

The number of content items that may be shared in a session.

The number of other running applications that are allowed next to a session on a device.

The maximum amount of time a content item may be shared in a session.

The number of sessions a user or device is allowed to participate in simultaneously.

The minutes of real-time content data allowed to be shared per day.

The allowed inactivity time of the device or its owner.

Whether the participants may finish current content rendering when the owner leaves the session.

Whether the participants may only access the content item using normal playback, or whether also operations like pausing, fast-forwarding or rewinding the content is permitted.

Whether the participants may start playback of the content item at any time, or whether they can only join in on an existing playback operation initiated by the first participant to start playback. This option means that if a participant joins after say half an hour, he cannot see the first half hour of the content item.

Whether only one participant has control over the content rendering (start, stop, pause, fast-forward, rewind, . . . ) or that all/multiple participants have control.

It is possible that above limitations are included in the license issued by the content provider and that only that license is used when sharing content in a community, but it is also possible that a derivative license is created for such sharing in a community. Such derivative license could be made by the device that shares the content item. Such derivative license could also incorporate a set of above limitations within the maneuvering space of the original license and the community DRM rules. One can for example imagine that a content provider offers a set of limitations in the original license between which one can choose when sharing content, e.g. limit by time or by participants, whatever suits the person that shares his content considers best.

In addition or alternatively to being included in the access control data, some of the limitations mentioned above may also be hardcoded in the source and/or sink devices as part of the DRM system. This may be beneficial for system complexity, i.e. users always experience the same kind of limitations for all content, and potentially also for system security since certain limitation always hold enforced by the devices and not potentially be not enabled in the access control data.

A way to improve the security of the present invention is to lock to the location of the shared content to the virtual community. This prevents a situation in which somebody copies the content to a different location. In such a situation, any device on the access sharing network can obtain a copy of the access control data and then access the copied content item. This means sharing is enabled without authorization by the owner. To prevent this, all or part of an address or location of the original content item should be specified in the access control data, i.e. the content is bound to the virtual community location. For example the access control data may specify the Uniform Resource Locator. All compliant devices used to access the content will verify that they obtain it from the correct location.

Optionally the devices also verifies that the content is accessed from the right context. The latter is to prevent that content is embedded in a different context (e.g. using embedding a picture from a different server as is now possible using webpages).

In one preferred embodiment the operations performed by the source and render devices are as follows.
(1) Both devices join the access sharing network.
(2) The render device obtains the content. The source device may implement restrictions on distribution of the content.
(3) The render device obtains a license, which license may be the original license plus some additional access control data set by the source device. The source device may implement restrictions on distribution of the license. The source device may also create some access control data as part of this step for the receiver. The license may be made available by a different source device from the source device that made the content available to the render device.
(4) The render device performs the usual DRM verification and checking operations, such as checking whether the license allows playback or whether the validity period of the content is not expired.
(5) The render device checks if the requirements for participating in the access network and sharing content are met (typically verify if the users are 'active', or have a 'session', and e.g. verifying the conditions/limitations from the list included in the text).
(6) If the previous steps are successful, the render device decrypts and renders the content.
(7) Step 5 is repeated until the requirements are no longer met.

Figure 5:
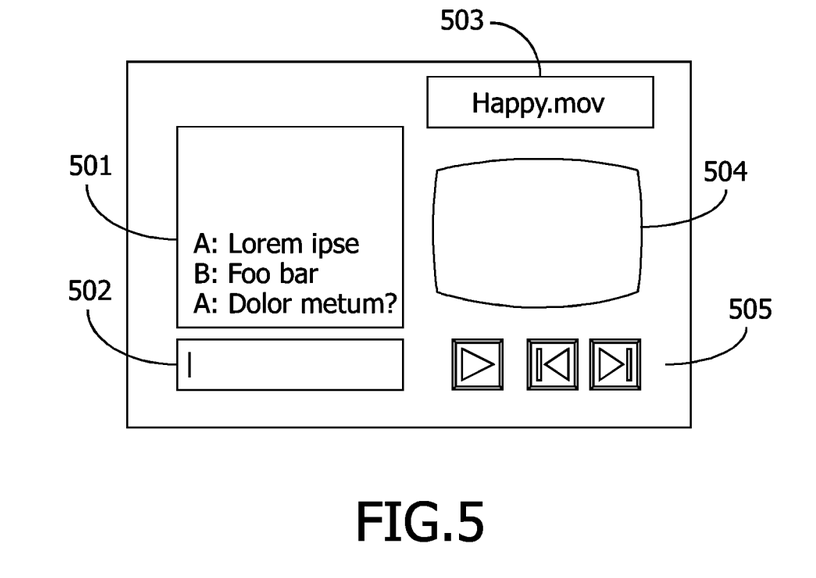
FIG. 5 schematically illustrates an embodiment of a user interface of an access sharing application.

FIG. 5 schematically illustrates an embodiment of a user interface of an access sharing application using the present invention. On the left, a chat session between users A and B is shown in chat window 501. The user can enter new text in input field 502. On the right, an input field 503 is provided where the user can enter a content item he would like to see rendered. If such a content item can be obtained from the access sharing network, and access control data can be obtained, the content item is shown in display area 504. Control buttons 505 are provided to control playback of the content item.

In a typical scenario, either user A or B offers the content to the access network, and the same user subsequently starts the rendering as part of a chat session or other interactive activity.

In many cases, an access sharing network is primarily designed to share content. Additionally, channels for communication, such as chat lines or forums may be included. But this is merely a matter of perspective. One might also say that a discussion forum or instant messaging network is provided with the ability to share files. Such a forum or network is to be regarded as an access sharing network.

For instance, an access sharing network may be provided with a discussion forum on which users can leave messages to other users. In such an embodiment it is possible to leave a message with a content item (or fragment thereof) embedded in one of the messages. Typically then the content item is available for a predetermined time after the node that made it available has ceased to be a member of the access sharing network, or alternatively has ceased to be a member of the discussion forum. It is also possible to share the access control data in this way.

The invention may find application in (massive) multi-player online (role playing) games. These games often already have the possibility for participants to communicate actively and to introduce their own content into the game. For instance, participants may upload pictures or sounds to customize the appearance of the game character ("avatar") they are operating in the game. In a virtual world, some players may direct their characters to go to the virtual cinema and one player contributes the movie, or they can upload their music to the stereo in their virtual home which can be listened to when other players visit their virtual home. In this application, the game represents the access sharing network, and the close proximity of the game characters, e.g. in a same virtual room, represents an indication that the players operating those characters are members of said access sharing network.

International patent application WO 02/073378 discloses a method in which a protected content item obtained from a file sharing network can be stored in a flexible way on a storage medium such as a CD-ROM. The access control data is encrypted using a key and stored together with the content item. All devices that are member of a particular group have access to a corresponding decryption key and so can decrypt the access control data, thereby obtaining permission to access the protected content item. This method can be used in conjunction with the present invention.

European patent application serial number 04101570.2 discloses an automated exchange of content items via file sharing networks, in which the clients 101-105 are arranged for automatic bartering of desirable objects. This can be used in conjunction with the present invention.

It should be noted that the above-mentioned embodiments illustrate rather than limit the invention, and that those skilled in the art will be able to design many alternative embodiments without departing from the scope of the appended claims. For instance, instead of directly exchanging the access control data between devices 101 and 105, it is also possible that the data is exchanged using an intermediary third party.

Making a content item available on an access sharing network may be subject to distribution limits to others dependent if there's an ongoing session (i.e. both are part of the access network).

Part of the limitations may be enforced by the source device. Having the source perform a security check before it sends the licenses/access control data or content to the sink device can be quite effective security-wise. This applies especially if you use the model that the activity of the participants is continuously verified and the content is streamed, i.e. each receiver only has content it renders, but not the content that it might render in the future.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlled access to content among a set of devices actively communicating with each other over an access sharing network, comprising:
joining, via a sharing application, a first device of the set of devices to the access sharing network, wherein the first device participates in a session of the sharing application with a second device in one or more interactive channels on the access sharing network, wherein the one or more interactive channels consists of one of an instant messaging channel, a discussion forum, a message board and a multiplayer game;
obtaining, at the first device, a content item from the access sharing network, wherein access to the content item (i) is restricted and (ii) requires a license that contains (ii)(a) access control data and (ii)(b) a decryption key to enable a requested operation that includes playback and recording operations of the content item at the first device, wherein (iii) the access control data (iii)(a) comprises one or more permissions that are granted with respect to the requested operation of the content item and (iii)(b) specifies an originating URL address of the content item assigned to at least one device of the set of devices of the access sharing network, and wherein the decryption key is necessary to decrypt the content item;
obtaining, at the first device, the license that contains the access control data and decryption key from the second device;
determining, at the first device, in response to (i) successfully evaluating the license that contains the access control data and the decryption key and (ii) verifying that the content item (ii)(a) is obtained from the originating URL address of the content item within the access sharing network to prevent sharing without authorization by an owner of the original of the content item and (ii)(b) is accessed from a right context of the requested operation to prevent a sharing of the content item embedded in a different context, that the first device is authorized to perform the requested operation of the content item; and
granting access and enabling the requested operation of the content item at the first device in accordance with the access control data determined from the license by using the access control data and the decryption key only in response to (i) verification that the content item is (i)(a) obtained from the originating URL address of the content item and (i)(b) accessed from the right context, and (ii) a positive determination that the second device is still an actively participating member in the session of the sharing application of the access sharing network.

2. The method of claim 1, further comprising:
using the access control data at the first device during a predetermined period of time after making a determination that the second device has ceased to be an actively participating member of the access sharing network.

3. The method of claim 1, further comprising:
ceasing the performing of the requested operation of the content item at the first device in response to detecting at the first device that no data has been received from the second device for a predetermined period of time.

4. The method of claim 1, further comprising:
computing, at the first device, a validity period of the access control data from data indicating an activity level of the second device on the access sharing network.

5. The method of claim 4, wherein the activity level comprises a predetermined amount of activity in the one or more interactive channels provided on the access sharing network.

6. A first device configured for controlled access to content among a set of devices actively communicating with each other over an access sharing network, comprising:
a microprocessor;
a sharing application executable by the microprocessor for use in (i) joining an access sharing network and (ii) obtaining a content item from the access sharing network, wherein the first device is configured to participate in a session of the sharing application with a second device in one or more interactive channels on the access sharing network, wherein the one or more interactive channels consists of one of an instant messaging channel, a discussion forum, a message board and a multiplayer game, and wherein access to the content item (i) is restricted and (ii) requires a license that contains (ii) (a) access control data and (ii)(b) a decryption key to enable a requested operation that includes playback and recording operations of the content item at the first device, wherein (iii) the access control data (iii)(a) comprises one or more permissions that are granted with respect to the requested operation of the content item and (iii)(b) specifies an originating URL address of the content item assigned to at least one device of the set of devices of the access sharing network, and wherein the decryption key is necessary to decrypt the content item;
a digital rights management (DRM) application executable by the microprocessor for obtaining the license that contains the access control data and the decryption key from a second device over the access sharing network, the DRM application further for determining in response to (i) successfully evaluating the license and (ii) verifying that the content item (ii)(a) is obtained from the originating URL address of the content item within the access sharing network to prevent sharing without authorization by an owner of the original of the content item and (ii)(b) is accessed from a right context of the requested operation to prevent a sharing of the content item embedded in a different context, that contains the access control data and the decryption key that the first device is authorized to perform the requested operation of the content item, and for granting access and enabling the requested operation of the content item at the first device in accordance with the access control data determined from the license by using the access control data and the decryption key only in response to (i) verification that the content item is (i)(a) obtained from the originating URL address of the content item and (i)(b) accessed from the right context, and (ii) a positive determination that the second device is still an actively participating member in the session of the sharing application of the access sharing network.

7. The first device of claim 6, wherein the sharing application module provides to further devices in the access sharing network certified information regarding content usage on the first device.

8. A non-transitory computer readable medium encoded with a computer program containing instructions for causing a programmable device to operate as the first device of claim 6.

\* \* \* \* \*